United States Patent [19]

Götz et al.

[11] Patent Number: 5,211,718
[45] Date of Patent: May 18, 1993

[54] CONVERTIBLE WITH A WIND-DEFLECTING COVER

[75] Inventors: Hans Götz, Böblingen; Karl-Heinz Baumann, Bondorf, both of Fed. Rep. of Germany

[73] Assignee: Mercedes-Benz AG, Fed. Rep. of Germany

[21] Appl. No.: 798,311

[22] Filed: Nov. 26, 1991

[30] Foreign Application Priority Data

Nov. 27, 1990 [DE] Fed. Rep. of Germany ....... 4037705

[51] Int. Cl.$^5$ .............................. B60J 7/22; B60J 7/20
[52] U.S. Cl. ................................ 296/180.1; 296/37.5; 296/37.16; 296/85; 296/136
[58] Field of Search ................... 296/180.1, 85, 180.5, 296/37.5, 37.16, 136; 280/756

[56] References Cited

U.S. PATENT DOCUMENTS

| 1,719,150 | 7/1929 | Wales ................................ 296/136 |
| 4,202,577 | 5/1980 | Breitschwerdt et al. ..... 296/37.16 X |
| 4,783,113 | 11/1988 | Padlo ................................ 296/136 |

FOREIGN PATENT DOCUMENTS

| 0258823 | 3/1988 | European Pat. Off. ......... 296/37.16 |
| 0316749 | 5/1989 | European Pat. Off. ......... 296/180.1 |
| 2718837 | 11/1978 | Fed. Rep. of Germany ... 296/37.16 |
| 8805994 | 5/1988 | Fed. Rep. of Germany ... 296/180.1 |
| 3913830 | 11/1989 | Fed. Rep. of Germany ... 296/180.1 |
| 3923558 | 3/1990 | Fed. Rep. of Germany . |
| 3914036 | 4/1990 | Fed. Rep. of Germany ...... 280/756 |
| 3915866 | 9/1990 | Fed. Rep. of Germany ... 296/180.1 |
| 0552705 | 5/1923 | France ................................ 296/85 |
| 2182010 | 5/1987 | United Kingdom ............. 296/180.1 |

Primary Examiner—Dennis H. Pedder
Attorney, Agent, or Firm—Evenson, McKeown, Edwards & Lenahan

[57] ABSTRACT

A convertible motor vehicle is provided with a wind-deflecting cover which covers the space behind a front row of seats at the top. A windscreen is secured on the cover and, in the operative position, projects approximately vertically from the level of the upper edge and can be lowered into an out-of-use position. The windscreen is formed by a roller blind having a winding-up roller fixed at a forward boundary edge of the cover. An alternative arrangement for accommodating a windscreen on the cover in the out-of-use position forms a single unit with the cover which has two panels resting one upon the other and arranged to be swivelled open at a hinge. Opposite to this hinge, the windscreen is swivellably fixed at a forward boundary edge of the lower panel and can be swiveled in between these panels.

7 Claims, 2 Drawing Sheets

CONVERTIBLE WITH A WIND-DEFLECTING COVER

BACKGROUND AND SUMMARY OF THE INVENTION

The present invention relates to a convertible motor vehicle with a wind-deflecting cover, and more particularly, to a cover for the space behind a front row of seats at the top and on which is secured, at a forward boundary edge, a windscreen which, in the operative position, projects approximately vertically from the level of the upper edge and can be lowered into an out-of-use position.

German Offenlegungsscrift 3,923,558 discloses a convertible vehicle with a wind-deflecting cover, on which a windscreen designed as a pane, panel or framed net is secured behind the front seats, vertically in the operative position. In the out-of-use position, the windscreen can be folded over against the partial cover or can be removed from a plug-in device. In either position, however, the windscreen is a bulky extra part which creates problems as regards its accommodation when not in use, spoils the appearance of the cover, is troublesome due to vibrations and makes stowing of the cover when the latter is not in use even more difficult.

An object on which the present invention is based is to accommodate the windscreen on the cover in the out-of-use position, forming a single unit with the cover.

This object has been achieved in accordance with the present invention by forming the windscreen as a roller blind with a winding-up roller fixed on the cover. Moreover, the cover can be in the form of two panels which rest one upon the other and can be swivelled open at a hinge opposite which the windscreen is swivellably fixed on the lower panel so as to be swivelled in between these panels.

A roller blind utilized as windscreen, the winding-up roller of which is fixed on the cover, offers the advantage that, in the out-of-use position, i.e., with the roller-blind material wound up, the windscreen already rests against the cover in an integrated manner and is visually pleasing when stored. An already present, transversely extending frame part of the cover can be used to receive the winding-up roller. A windscreen is likewise accommodated without troublesome vibrations and in such a way as to be very easy to handle during transport in a container formed by two panels of a cover. The upper panel can also serve for locking the raised windscreen. The cover, which rest horizontally on the convertible superstructure, can be locked by swinging shut a hood-compartment lid by structure provided for this purpose if it is ensured that the lid is only actuated while the vehicle is at rest.

BRIEF DESCRIPTION OF THE DRAWINGS

These and other objects, features and advantages of the present invention will become more apparent from the following detailed description of currently preferred embodiments when taken in conjunction with the accompanying drawings wherein.

DETAILED DESCRIPTION OF THE DRAWINGS

Figure 1:
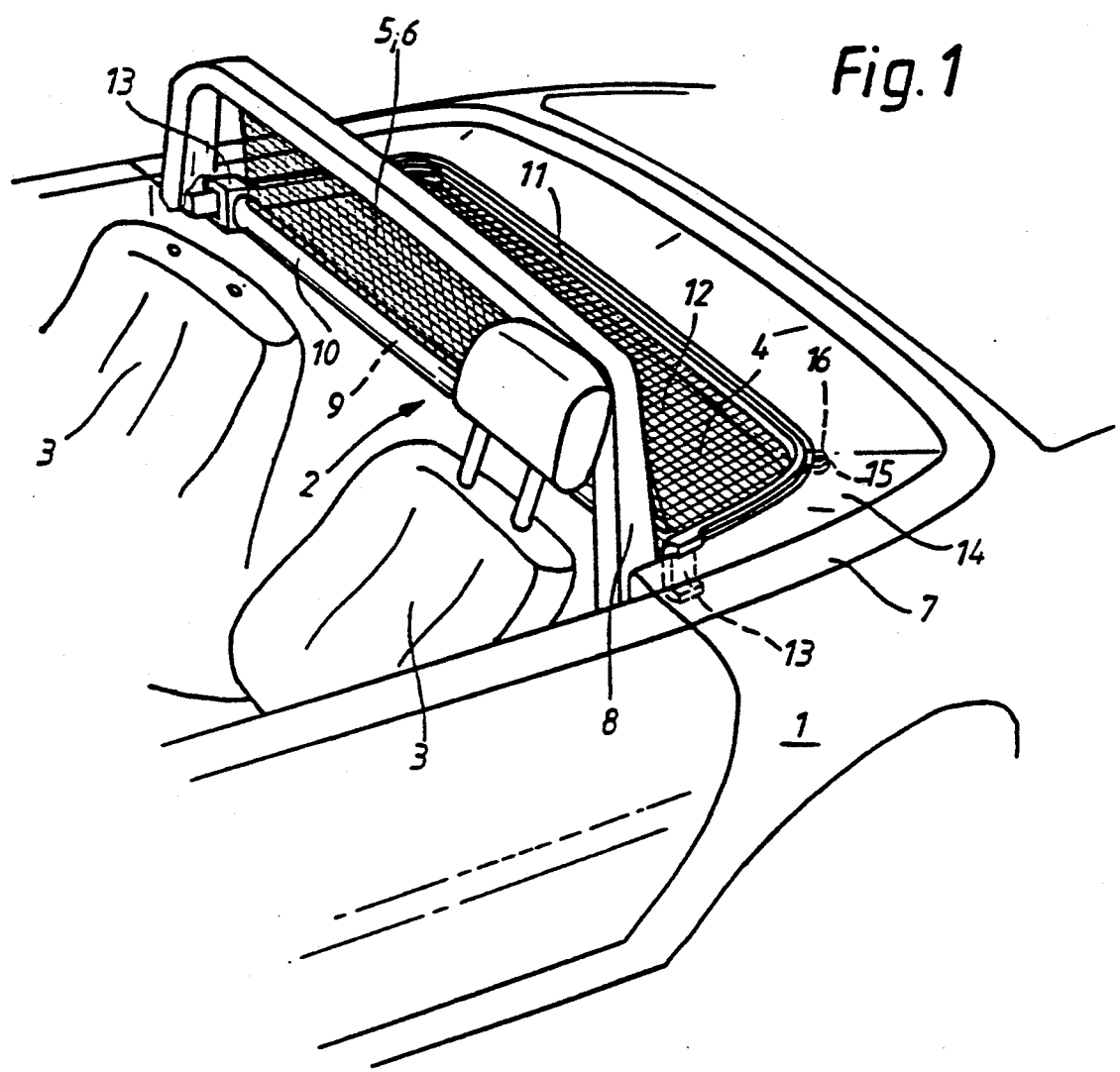
FIG. 1 is a perspective view of a rear area of a convertible motor vehicle with a horizontal cover and a windscreen configured as a roller blind projecting up vertically from the latter in accordance with the present invention.

FIG. 1 shows a rear area of a convertible vehicle 1, the open space 2 of which is covered behind a front row 3 of seats by a horizontally resting cover 4. A windscreen 5 is fixed on a forward boundary edge of the cover 4 and is formed by a roller blind 6 which, in the operative position, projects approximately vertically from the level of the upper edge 7 of the convertible 1 and is fixed releasably by an upper end on a roll bar 8. The windscreen 5 can be lowered into an out-of-use position, in which it lies wound up around a winding-up roller 9. The winding-up roller 9 is fixed on the cover 4 and is assisted in its winding-up movement by a spring (not shown).

Figure 2:
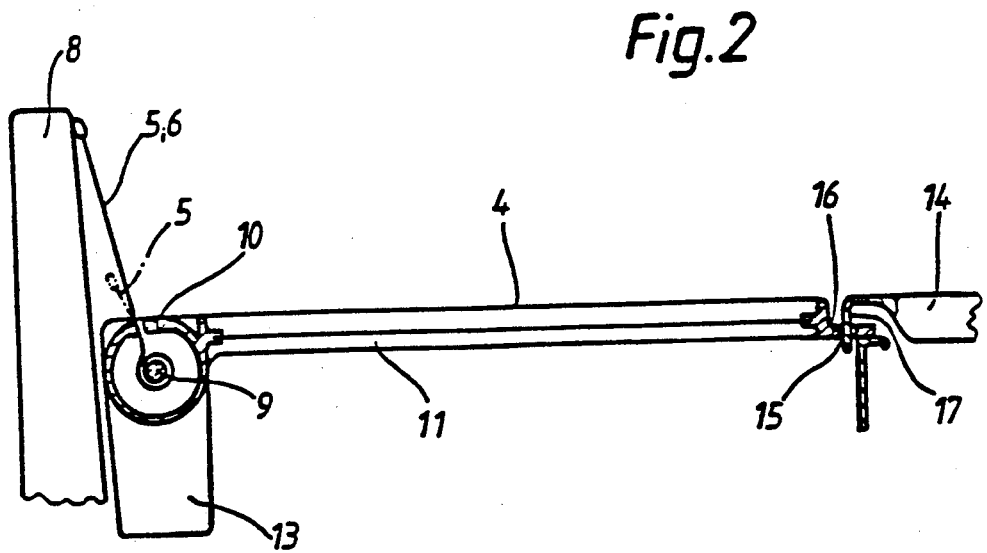
FIG. 2 is a sectional side view along line II—II in FIG. 1.

As can be seen more clearly in FIG. 2, the winding-up roller 9 is accommodated in a forward, transversely extending frame part 10 of the cover 4. As a result, the windscreen 5 lies in this frame part 10 in an almost fully integrated manner in the out-of-use position and is thus accommodated in a visually and functionally attractive manner. The cover 4 itself is configured as a covered frame 11, which is covered with an openwork net 12. The roller blind 6 also has an openwork net structure, allowing an observer to see through the cover 4 and through the windscreen 5, but wind turbulence from the vehicle rear towards the front row 3 of seats is nevertheless kept away from this row of seats.

On the front of the cover frame 11, the cover 4 has laterally situated supports 13 and, near to a hood-compartment lid 14, extensions 16 which are provided as locking devices with an opening 15. A locking pin 17 secured on the hood-compartment lid 14 engages into the opening 15 when the hood-compartment lid 14 is closed. The cover 4 is thereby locked automatically by the closing of the hood-compartment lid 14.

Figure 3:
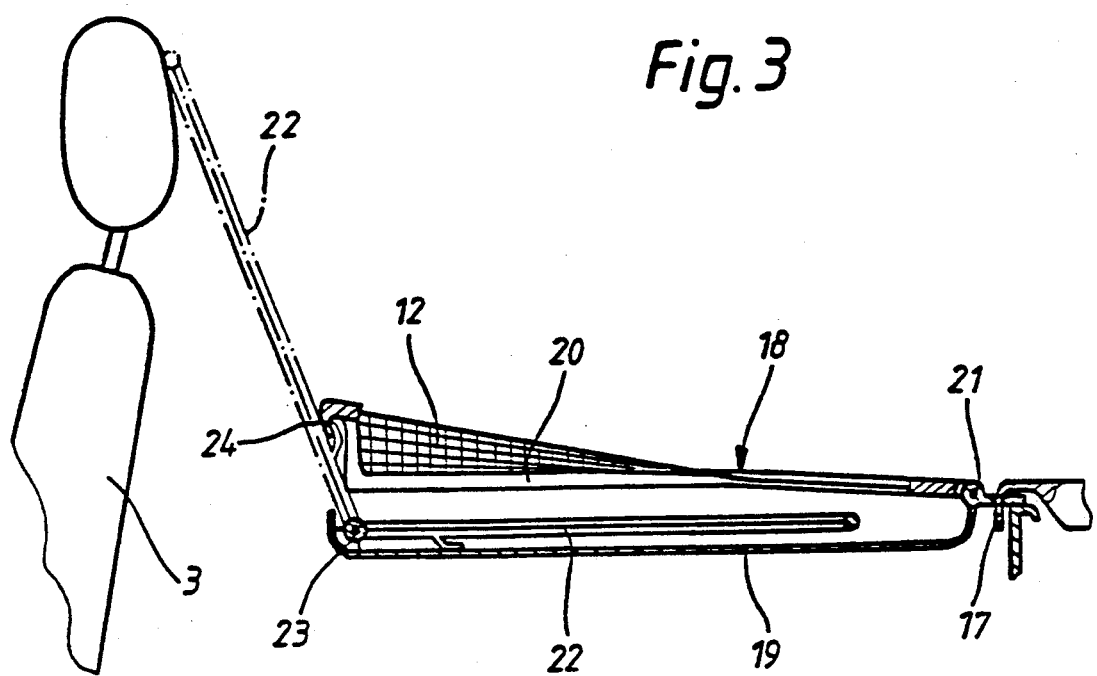
FIG. 3 is a side elevational view, partially in section, of an embodiment of a cover in accordance with the present invention with an articulated windscreen.

FIG. 3 shows a cover 18 which comprises two panels 19, 20 which rest one upon the other and can be swivelled apart at a hinge 21. After a swivelling-open movement, there is space for a panel-shaped windscreen 22 to be stored in the out-of-use position. The windscreen 22 is fixed swivellably on the lower panel 19, via a hinge 23. The cover 18 can then be transported as a unit with the windscreen 22. The windscreen 22 can be swivelled up into an operative position (designated by chain lines in FIG. 3), in which it projects upwards approximately vertically but forwardly from the upper edge 7 of the convertible 1 behind the front row 3 of seats and, together with the cover 18, protects this row 3 of seats from air swirls coming from the rear area. The windscreen 22 is locked on the upper plate 20 by an extension 24.

Figure 4:
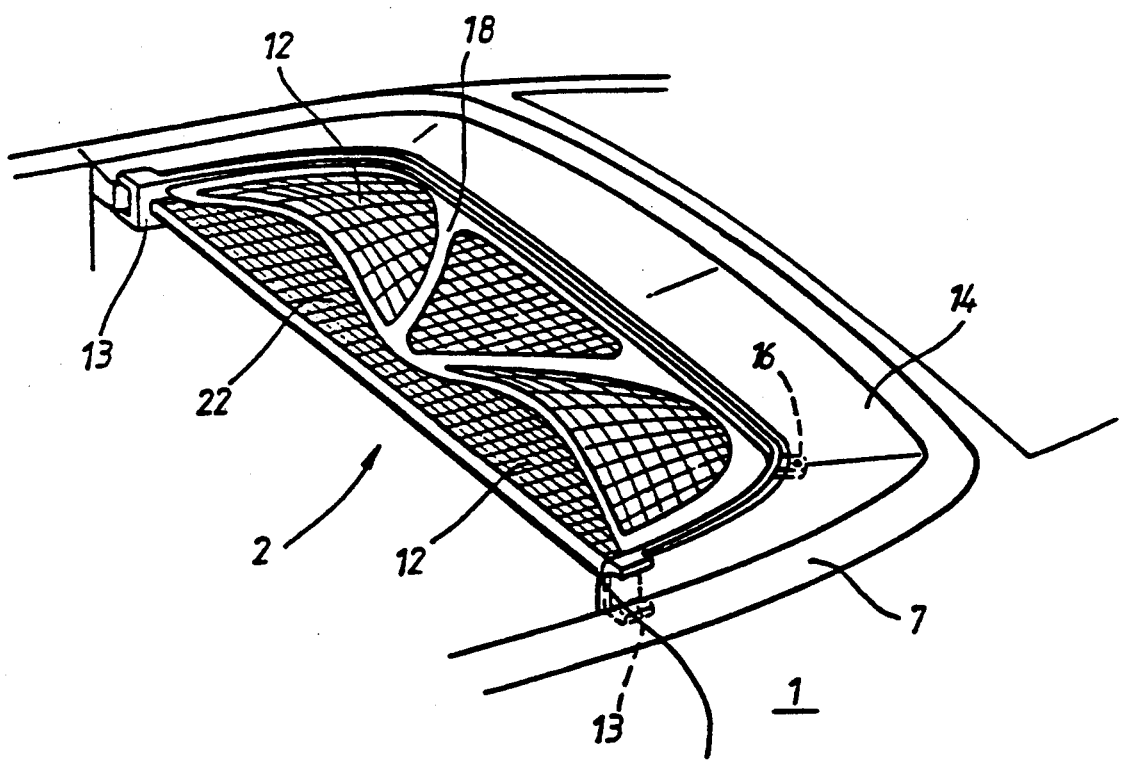
FIG. 4 is a perspective plan view of the cover of FIG. 3 showing how the windscreen is accommodated.

As can be seen in FIG. 4, the cover 18 and also the windscreen 22 have portions which ar configured as an openwork net 12, making it possible to see through and reducing the visual impression of a protective panel. As described in connection with FIGS. 1 and 2, this cover 18 is locked in its closed position via supports 13 at the front and by the engagement of locking structure 17 of the hood-compartment lid 14 at the rear.

Although the invention has been described and illustrated in detail it is to be clearly understood that the same is by way of illustration and example, and is not to be taken by way of limitation. The spirit and scope of the present invention are to be limited only by the terms of the appended claims.

What is claimed is:

1. A convertible vehicle having a wind-deflecting cover for a space behind a top portion of a front row of seats and a windscreen secured at a forward boundary edge thereof and configured such that the windscreen in an operative position thereof, projects approximately vertically from a level of an upper edge of the vehicle and can be lowered into an out-of-use position thereof, wherein the cover comprises two panels resting one upon the other and configured to be swivelled open at a hinge portion, and, opposite to the hinge portion, the windscreen is swivellably fixed on a lower panel of the two panels and is arranged to be swivelled in between these panels, and an upper panel of the two panels has an extension which locks the windscreen in its swivelled-up operative position.

2. A convertible vehicle having a wind-deflecting cover for a space behind a top portion of front row of seats and a windscreen secured on the cover at a forward boundary edge thereof and configured such that the windscreen, in an operative position thereof, projects approximately vertically from a level of an upper edge of the vehicle and can be lowered into an out-of-use position thereof, wherein the windscreen comprises a roller blind and an winding-up roller fixed on the cover, wherein the cover comprises locking devices situated proximate to a hood-compartment lid of a hood of the vehicle, and the locking devices are configured as extensions which can be locked by locks of the hood-compartment lid in the closed position of the lid.

3. A convertible vehicle having a wind-deflecting cover for a space behind a top portion of a front row of seats and a windscreen secured at a forward boundary edge thereof and configured such that the windscreen in an operative position thereof, projects approximately vertically from a level of an upper edge of the vehicle and can be lowered into an out-of-use position thereof, wherein the cover comprises two panels resting one upon the other and configured to be swivelled open at a hinge portion, and, opposite to the hinge portion, the windscreen is swivellably fixed on a lower panel of the two panels and is arranged to be swivelled in between these panels, and the cover comprises locking devices situated proximate to a hood-compartment lid of a hood of the vehicle, and the locking devices are configured as extensions which can be locked by locks of the hood-compartment lid in the closed position of the lid.

4. The convertible vehicle according to claim 2, wherein, in the operative position, the windscreen is fixed on a vehicle roll bar.

5. The convertible vehicle according to claim 1, wherein, in the operative position, the windscreen is fixed on a vehicle roll bar.

6. The convertible vehicle according to claim 2, wherein at least one of the windscreen and the cover has portions which are an openwork net.

7. The convertible vehicle according to claim 1, wherein at least one of the windscreen and the cover has portions which are an openwork net.

* * * * *